July 11, 1933.  R. A. GILBERT  1,918,226
MULTIPLE SPOT WELDING ELECTRODE
Filed May 19, 1932
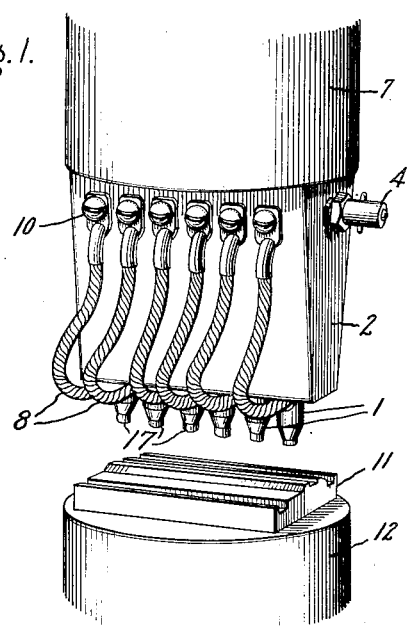
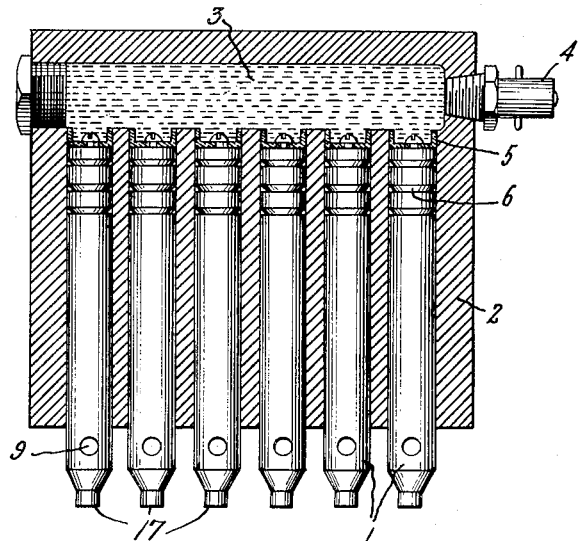
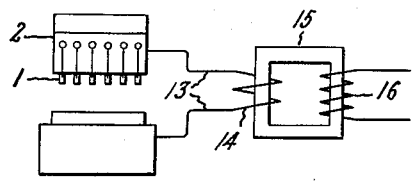
Inventor:
Ralph A. Gilbert,
by *Charles E. Tullar*
His Attorney.

Patented July 11, 1933

1,918,226

UNITED STATES PATENT OFFICE

RALPH A. GILBERT, OF PITTSFIELD, MASSACHUSETTS, ASSIGNOR TO GENERAL ELECTRIC COMPANY, A CORPORATION OF NEW YORK

MULTIPLE SPOT WELDING ELECTRODE

Application filed May 19, 1932. Serial No. 612,275.

My invention relates to resistance welding apparatus and more particularly to an improved multiple spot welding electrode.

In resistance spot welding, the work parts are joined to one another at localized points by welds produced at these points through the application of welding current and pressure. Very often the welding operation can be greatly expedited by simultaneously producing a plurality of welds. Arrangements for doing this have not generally been employed, however, because of the difficulty of equalizing the pressures of the several electrodes which simultaneously engage the work parts. If these electrodes are connected to independent sources of supply the inequality of electrode pressures is not very serious. However, when the electrodes are connected in multiple to a common source of supply, it is essential that the pressures of the several electrodes be substantially equal if satisfactory spot welds are to be produced. If the pressures between the electrodes vary materially the welding current applied to the work through the several electrodes will divide unequally and the welds produced at some of the electrodes will be burned, whereas at other electrodes the amount of current and pressure will be insufficient to produce welds.

It is an object of my invention to provide a multiple spot welding electrode in which the arrangement of parts is such that exactly the same pressure is applied to each of the work engaging contacts of the electrode regardless of variations in the contour or thickness of the parts being welded.

It is a further object of my invention to provide a multiple electrode which may be attached to welding apparatus designed for producing single spot welds in order to adapt it for simultaneously producing a plurality of welds.

Other objects of my invention will become apparent from a consideration of the following description taken in connection with the accompanying drawing in which Fig. 1 illustrates the application of my electrode to a welding machine; Fig. 2 is a section view thereof illustrating the arrangement of its parts, and Fig. 3 is a diagram illustrating the electrical connections that will usually be employed when using my multiple spot welding electrode.

Referring to the drawing, my improved electrode comprises a plurality of plungers 1 which project into a fluid chamber 3 located in a supporting member 2. In the construction illustrated each plunger is located in a cylinder which communicates with and forms a part of chamber 3. Each plunger constitutes a piston to which pressure is applied through the agency of a fluid contained in chamber 3. Preferably an inelastic fluid, such as grease, glycerine, water, and the like, is used. I have found a light grease to be particularly satisfactory and have provided the electrode with a check valve fitting 4 for supplying grease to chamber 3 through the agency of a grease gun such as used in lubricating motor cars and the like. It is of course apparent that other means may be employed for applying fluid material to chamber 3. Each plunger is provided with a cup-shaped leather washer 5 and oil rings 6 to prevent the fluid in chamber 3 from leaking past them. Other arrangements may be employed to accomplish this result.

In the illustrated arrangement my improved electrode is connected to the upper arm 7 of a spot welding machine through which pressure and current are applied thereto and to the work. The electrode plungers are preferably made of electrically conductive material and connected electrically with the supporting member 2, which is also preferably made of an electrically conductive material, by means of conductors 8, one end of each of which is secured in opening 9 in plungers 1 and the other end of which is attached by screws 10 to member 2. In the illustrated arrangement the counter electrode for the work engaging plungers 1 of my multiple electrode is constituted by the block 11 supported on the lower arm 12 of a welding machine through which pressure and current are applied thereto and to the work. As shown in Fig. 3, current is supplied to the terminal blocks 2 and 12 of the welding machine through conductors 13 connected to the secondary 14 of a welding transformer 15 whose primary 16 is connected to a suitable source of supply.

In the particular arrangement illustrated, welding pressure is applied to the work parts by forcing the contacts 17 of the several plungers 1 into engagement with the work. These several plungers will accommodate themselves to the surface of the work parts and equally divide the applied pressure through the agency of the fluid contained in chamber 3. It is, of course, apparent that my multiple spot welding electrode may be held in fixed relation to the work and a counter electrode and welding pressure applied to the several contacts by the application of fluid under pressure to chamber 3. Irrespective of the arrangement employed for applying the welding pressure, my improved multiple spot welding electrode will equalize the pressure applied to its work engaging contacts and thus insure a satisfactory welding operation at their several points of contact with the work to be welded.

Although fluid actuating means has been referred to above for operating the several plungers and equalizing the pressure applied thereby to the work, it is of course apparent that pasty materials or finely divided solids which behave like a fluid when subjected to pressure may be used for equalizing the pressure between the several electrode plungers.

In the arrangement illustrated in the drawing my electrode has been applied to the upper support of the welding machine. It is of course apparent that the arrangement of parts may be reversed and that it may be applied to the lower support 12 of the welding machine. Generally it will not be found necessary to apply my improved electrode to both of the electrode supports although such an arrangement is not precluded.

What I claim as new and desire to secure by Letters Patent of the United States, is:—

1. A multiple electrode for resistance spot welding machines comprising a plurality of work engaging contacts, means for simultaneously moving said contacts into and out of engagement with the work, and fluid actuated means for equalizing the pressure of said contacts on the work.

2. Welding apparatus comprising a plurality of electrode plungers, a supporting member for said plungers having a fluid chamber into which each of said plungers projects, and means for connecting said plungers to a source of welding current.

3. A multiple electrode for resistance spot welding machines comprising a terminal block, a plurality of independently movable plungers in said block, means in said block for supplying a single source of fluid pressure to each of said plungers, and means for electrically connecting each of said plungers to said terminal block.

4. A multiple spot welding electrode comprising a plurality of independently movable plungers, a support for said plungers having a chamber into which each of said plungers projects, means for supplying to said chamber a fluid for backing up said plungers, and means for supplying welding current to each of said plungers.

5. Welding apparatus comprising opposed terminal members and means for supplying welding current and pressure to said members, one of said members having a plurality of independently movable work engaging plungers, means in said member for supplying a single source of fluid pressure to each of said plungers, and means for electrically connecting said plungers to said member.

6. An electrode for resistance spot welding machines comprising a plurality of work engaging contacts, a plurality of cylinders, a plurality of plungers in said cylinders, means for supporting said contacts on said plungers, means for connecting said cylinders to a common chamber, means for supplying fluid pressure to said chamber, and means for electrically connecting each of said contacts in multiple to a source of welding current.

RALPH A. GILBERT.